United States Patent [19]

Terada

[11] Patent Number: 4,942,590
[45] Date of Patent: Jul. 17, 1990

[54] OPTIMUM CLOCK GENERATOR IN DATA COMMUNICATION

[75] Inventor: Hisashi Terada, Kawasaki, Japan

[73] Assignee: Kabushiki Kaisha Kenwood, Tokyo, Japan

[21] Appl. No.: 263,365

[22] Filed: Oct. 27, 1988

[30] Foreign Application Priority Data

Oct. 30, 1987 [JP] Japan .................. 62-274825

[51] Int. Cl.$^5$ .............................. H04K 1/00
[52] U.S. Cl. ......................... 375/1; 375/119
[58] Field of Search .............. 375/100, 118, 119, 1

[56] References Cited

U.S. PATENT DOCUMENTS

| | | | |
|---|---|---|---|
| 4,270,210 | 5/1981 | Tan et al. | 375/100 |
| 4,386,323 | 5/1983 | Jansen | 375/119 |
| 4,598,413 | 7/1986 | Szechenyi | 375/119 |
| 4,672,637 | 6/1987 | Halpern et al. | 375/119 |
| 4,780,889 | 10/1988 | Ley et al. | 375/119 |
| 4,785,468 | 11/1988 | Yoshida | 375/119 |

FOREIGN PATENT DOCUMENTS 63-133728  6/1988  Japan .................. 375/119

*Primary Examiner*—Salvatore Cangialosi
*Attorney, Agent, or Firm*—Sixbey, Friedman, Leedom & Ferguson

[57] ABSTRACT

A clock generator in a data receiver for generating an optimum PN code clock used by a spectrum spread (55) communication receiver. The generator comprises a clock generator for generating a plurality of clocks having different phases; a synchronization signal detection circuit for detecting a synchronization signal within a received signal; an optimum clock discrimination circuit for discriminating a first active clock from the plurality of clocks after the synchronization signal detection circuit detected the synchronization signal; and a clock selection circuit for selecting and outputting the clock discriminated from the plurality of clocks by the optimum clock discrimination circuit.

2 Claims, 4 Drawing Sheets

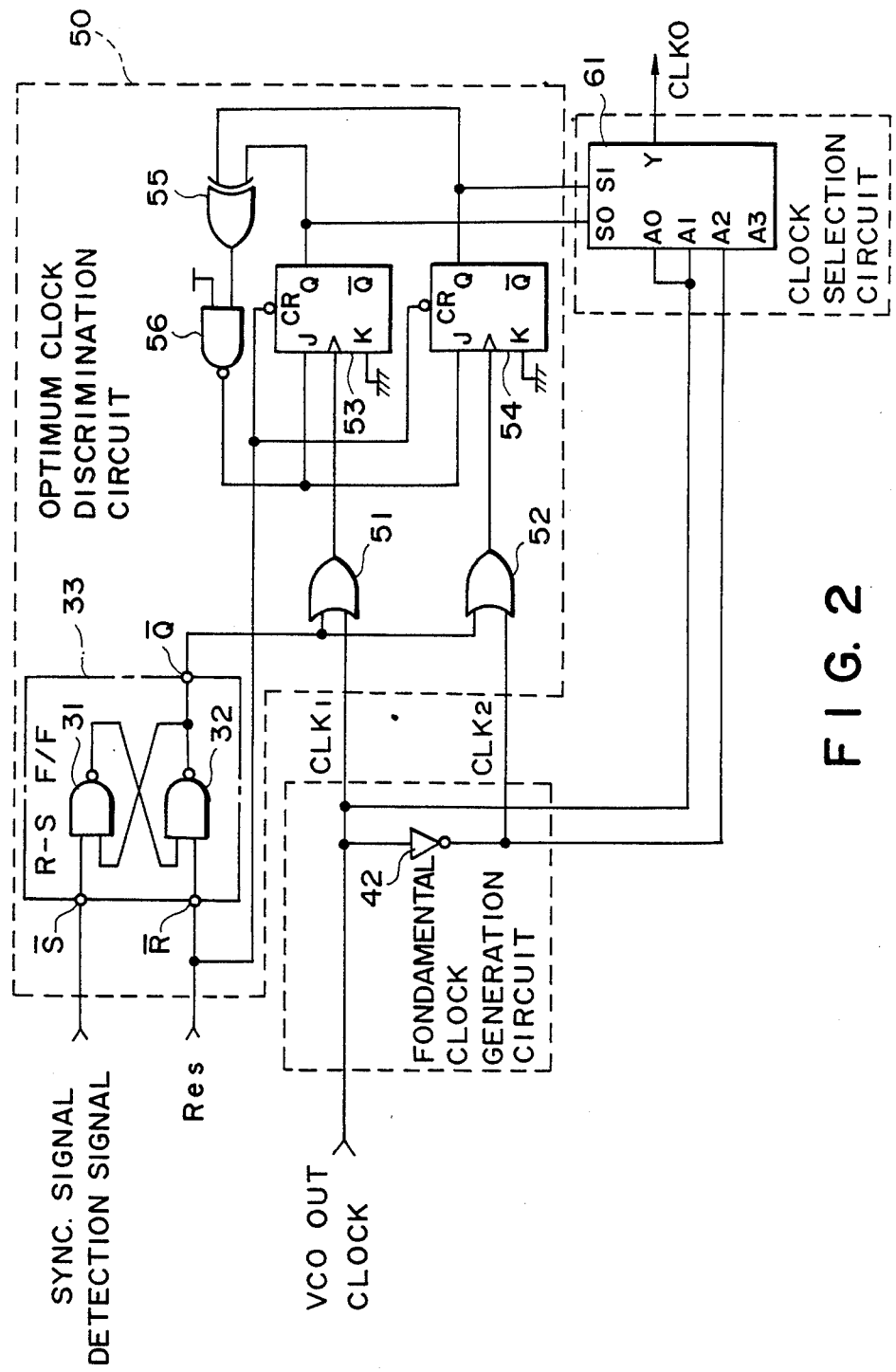
F I G. 2

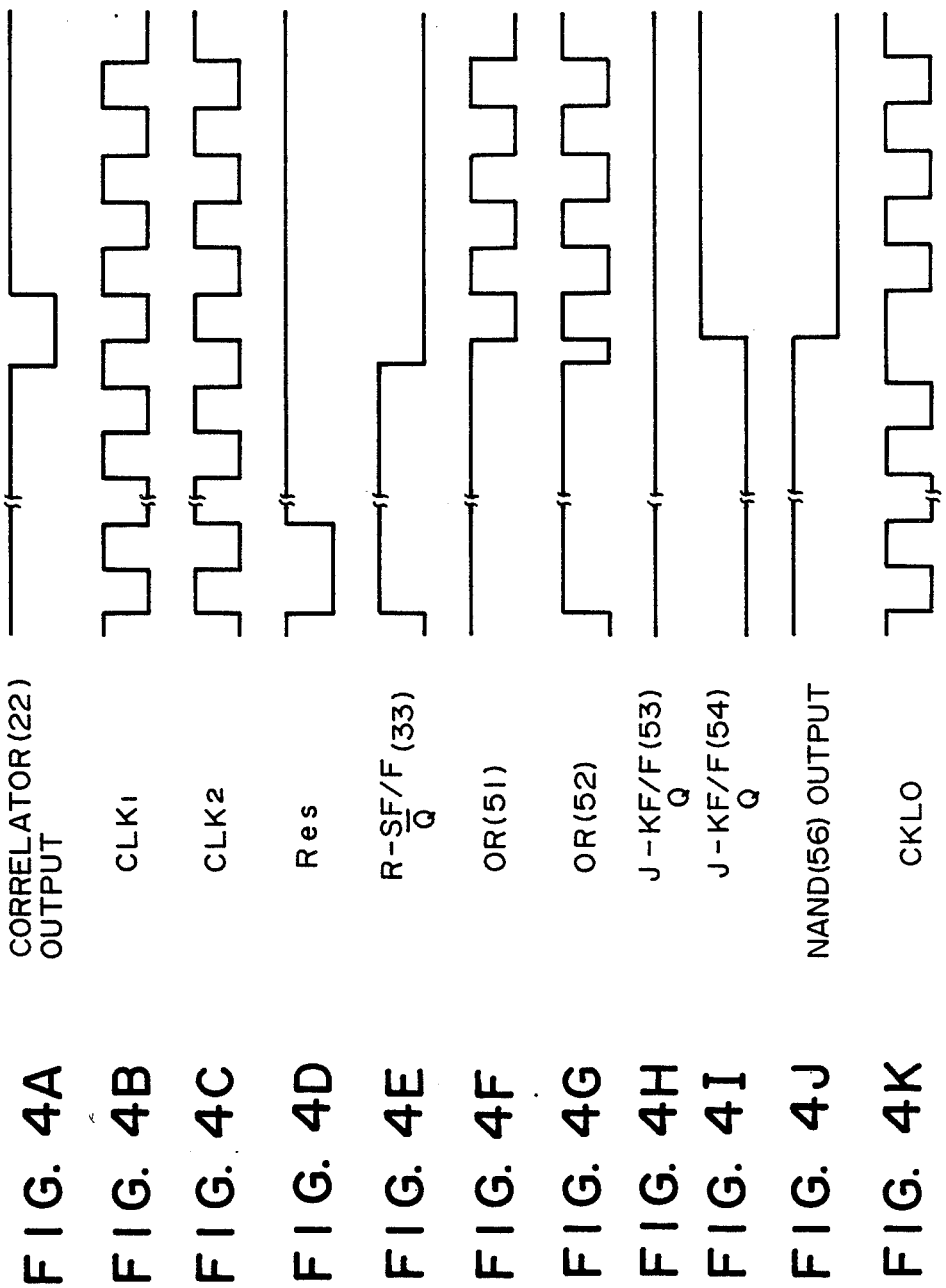

OPTIMUM CLOCK GENERATOR IN DATA COMMUNICATION

BACKGROUND OF THE INVENTION

1. Field of the Invention

The present invention relates to an optimum clock generator in a data receiver, particularly suitable for generating, for example, a PN code clock for a PN code generator of a spectrum spread (SS) communication receiver.

2. Related Art

SS communications are widely used in satellite communications and the like because of its effective reduction in transmission power. In an SS communication, at the transmitting side, communication data are modulated and, thereafter, spread with a fast PN code (pseudo noise code) to generate a wide band SS signal which is emitted in air as radio waves. At the receiving side, on the other hand, the wide band SS signal is despread with a PN code in synchro with the spread PN code and, thereafter, demodulated with a demodulator into the original communication data.

According to the information theory, an S/N ratio and the bandwidth are exchangeable so that less power is required to transmit a certain amount of information.

The structure of a receiving unit of a conventional SS receiver is shown in FIG. 1.

Referring to FIG. 1, an SS received signal is inputted to a correlation detector 10 where it is correlated with two PN codes different in phase outputted from a PN code generator 12 and then detected. Connected to the output side of the correlation detector 10 is a controller 14 where a difference between two correlated detection outputs is calculated by a subtracter and passed to a low-pass filter LPF to generate a control voltage.

Connected to the output side of the controller 14 is a voltage-controlled oscillator VCO 16 which oscillates at a frequency corresponding to the control voltage. Thus, VCO 16 generates clocks in synchro with the SS received signal, which clocks are supplied as PN code clocks to the PN code generator 12 connected to the output side of VCO 16.

The correlation detector 10, controller 14, VCO 16 and PN code generator 12 constitute a so-called Delay Lock Loop (DLL).

The PN code generator 12 generates a PN code for despreading and PN codes for the correlation detector 10, in response to the PN code clock.

The PN code for despreading is supplied to a mixer 18 where it is mixed with the SS received signal to generate a despread signal (e.g., BSPK wave). Connected to the output side of the mixer 18 is a costae circuit 20 where the original base band data are demodulated from the BPSK wave.

At the time immediately after the receiver starts its operation, there is no synchronization between the PN code on a radio wave from the transmitter and the PN code for despreading generated by the PN code generator 12, so that the DLL is not still locked in and a despread signal is not generated.

In view of the above point, at the time immediately after the receiver starts its operation, the SS received signal is inputted to a correlator 22 to detect a frame synchronization signal within the SS received signal, i.e., that portion of a simple PN code train without data, and output a synchronization signal detection signal (negative pulse).

The timing when the correlator 22 outputs the synchronization signal detection signal is a predetermined time before the data start position within a single frame of the SS received signal. Thus, when the correlator 22 outputs a synchronization signal detection signal, a counter 24, for example of a leading edge active type, is reset and thereafter it is caused to count the output clocks from VCO 16 at each leading edge thereof (namely, the leading edge of a clock is active relative to the counter 24). When the counter 24 counts a predetermined number of clocks, it outputs a reset signal to the PN code generator 12 to thus obtain initial synchronization of the PN code.

With the above conventional technique, however, there is no synchronization between the synchronization signal detection signal outputted from the correlator 22 and the output clock from VCO 16, so that the timing when the counter 24 counts a first clock after it was reset fluctuates within one clock duration at a maximum.

Accordingly, the timing when the PN code generator 12 is reset also fluctuates. Thus, after the initial synchronization, the PN code for despreading may be displaced from the PN code of the PN received signal. As a result, the lock-in of the DLL may take some timer or fail so that the correct demodulation of data delays or fails.

In consideration of the above problems, the present invention seeks to provide an optimum clock generator in a data receiver capable of reducing the fluctuation of time when the clock becomes active after the synchronization signal was received from the PN received signal to thus allow a more reliable operation of the data receiver.

SUMMARY OF THE INVENTION

According to the aspect of the present invention, the optimum clock generator in a data receiver comprises:

a clock generator for generating a plurality of clocks having different phases;

a synchronization signal detection circuit for detecting a synchronization signal within a received signal;

an optimum clock discrimination circuit for discriminating a first active clock from said plurality of clocks after said synchronization signal detection circuit detected said synchronization signal; and a clock selection circuit for selecting and outputting said clock discriminated from said plurality of clocks by said optimum clock discrimination circuit.

BRIEF DESCRIPTION OF THE DRAWINGS

FIG. 2 is a circuit diagram showing the structure of an embodiment of an optimum clock generator according to the present invention;

FIG. 4 is a timing chart illustrating the operation of the optimum clock generator shown in FIG. 2.

DESCRIPTION OF THE EMBODIMENT

An embodiment of the present invention will be described with reference to FIGS. 2 to 4.

Figure 1:
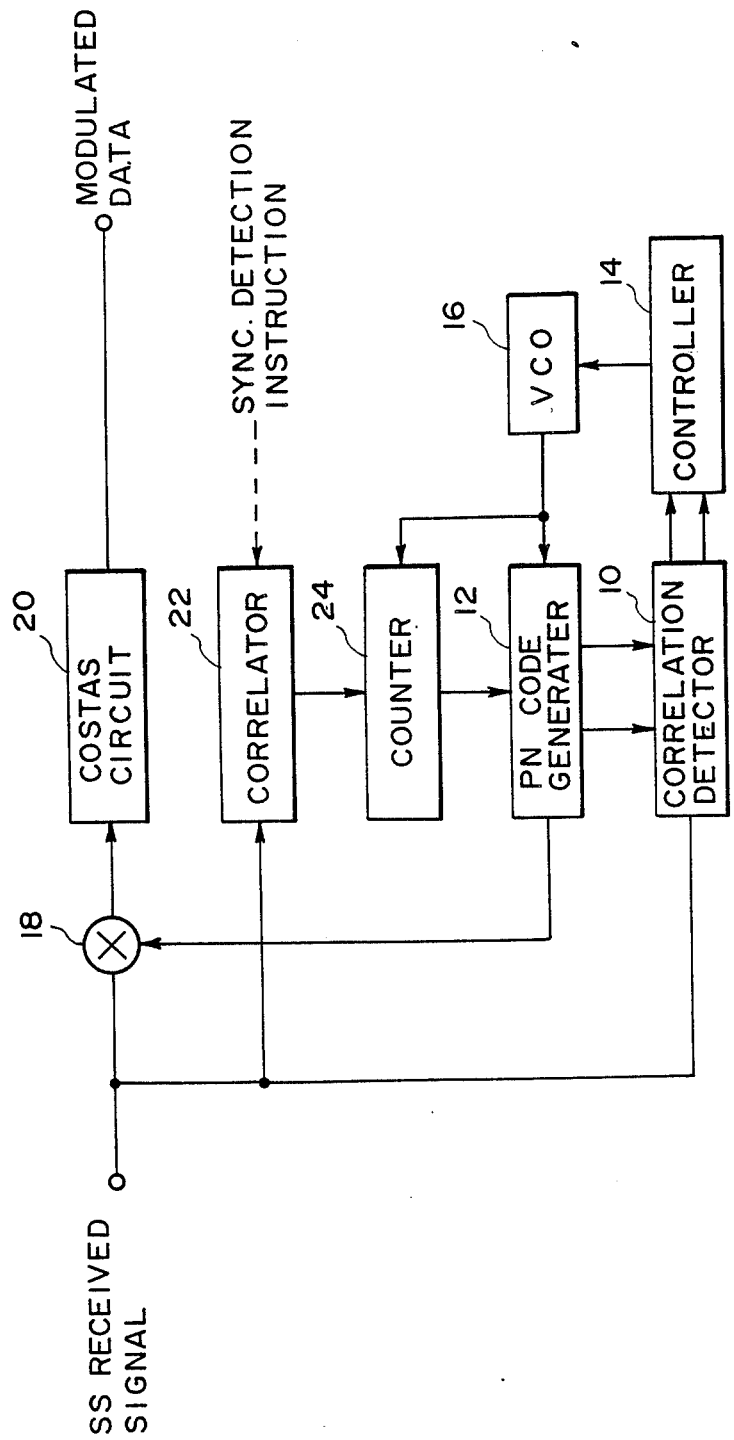
FIG. 1 is a block diagram showing the structure of the receiving unit of a conventional SS receiver.
Figure 3:
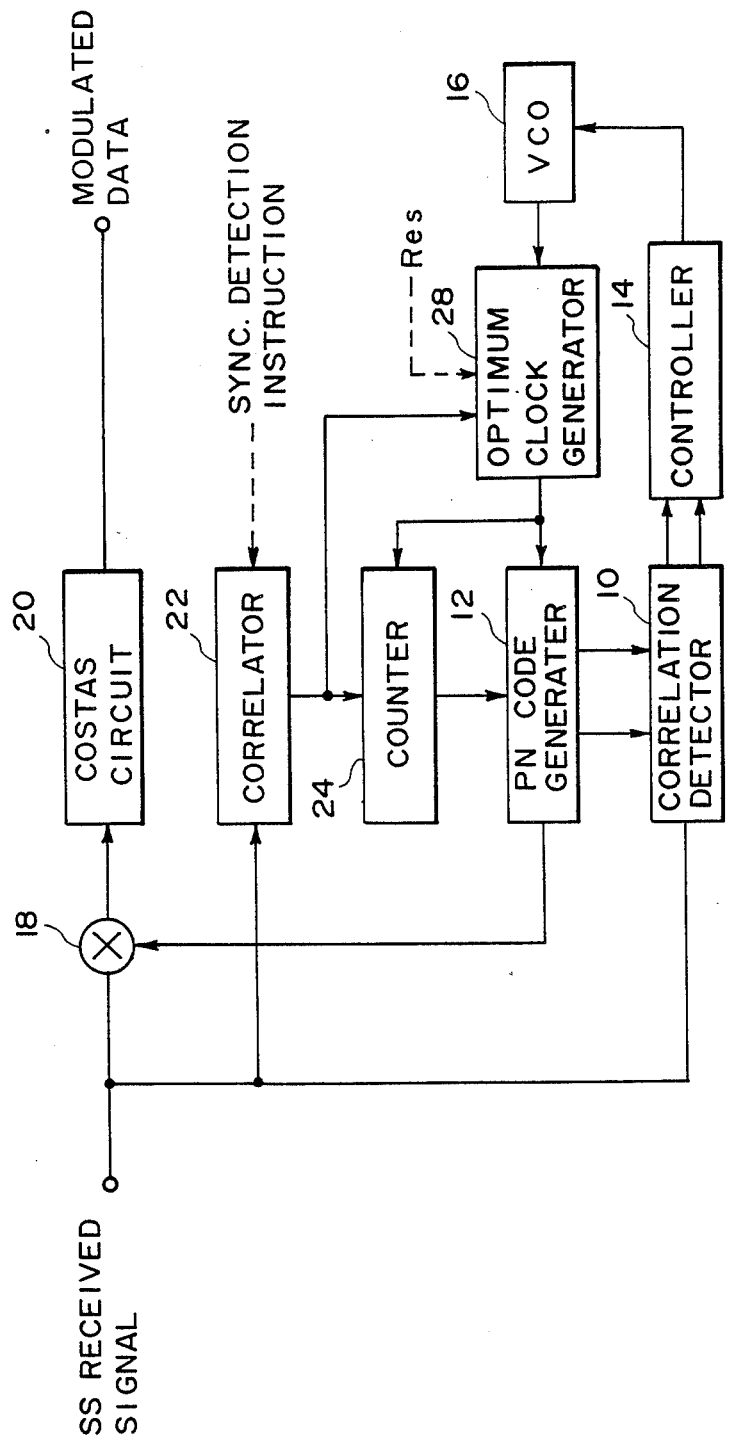
FIG. 3 is a block diagram showing the receiving unit of an SS receiver having the optimum clock generator shown in FIG. 2.

FIG. 3 is a block diagram showing the structure of the receiver unit of an SS receiver embodying the present invention.

Referring to FIG. 3, an SS received signal is inputted to a correlation detector 10 where it is correlated with two PN codes different in phase outputted from a PN code generator 12 and then detected. Connected to the output side of the correlation detector 10 is a controller 14 where a difference between two correlated detection outputs is calculated by a subtracter and passed to a low-pass filter LPF to generate a control voltage.

Connected to the output side of the controller 14 is a voltage-controlled oscillator VCO 16 which oscillates at a frequency corresponding to the control voltage. Thus, VCO 16 generates master clocks in synchro with the SS received signal, which clocks are supplied as PN code clocks to the PN code generator 12 via an optimum clock generator 28 connected to the output side of VCO 16.

The correlation detector 10, controller 14, VCO 16, optimum clock generator 28 and PN code generator 12 constitute a so-called Delay Lock Loop (DLL).

The PN code generator 12 generates a PN code for despreading and PN codes for the correlation detector 10, in response to the PN code clock supplied from the optimum clock generator 28.

The PN code for despreading is supplied to a mixer 18 where it is mixed with the SS received signal to generate a despread signal (e.g., BSPK wave). Connected to the output side of the mixer 18 is a costae circuit 20 where the original base band data are demodulated from the BPSK wave.

At the time immediately after the receiver starts its operation, there is no synchronization between the PN code on a radio wave from the transmitter and the PN code for despreading generated by the PN code generator 12, so that the DLL is not still locked in and a despread signal is not generated.

In view of the above point, at the time immediately after the receiver starts its operation, a synchronization detection instruction is given to the correlator 22 from a system controller (not shown). The SS received signal is inputted to a correlator 22 to detect a frame synchronization signal within the SS received signal, i.e., that portion of a simple PN code train without data, and output a synchronization signal detection signal of negative pulse.

The timing when the correlator 22 outputs the synchronization signal detection signal is a predetermined time before the data start position within a single frame of the SS received signal. Thus, when the correlator 22 outputs a synchronization signal detection signal, a counter 24 of a leading edge active type, is reset and thereafter it is caused to count the output clocks from VCO 16 at each leading edge thereof (namely, the leading edge of a clock is active relative to the counter 24). When the counter 24 counts a predetermined number of clocks, it outputs a reset signal to the PN code generator 12 to thus obtain initial synchronization of the PN code.

As will be appreciated from the description given later, the maximum fluctuation of clock leading edge of the optimum clock generator 28 relative to the synchronization signal detection signal is one half that of the clock leading edge of VCO 16. Therefore, the timing when the PN code generator 12 is reset is determined more correctly, and the deviation of the PN code for despreading after the initial synchronization from the PN code of the received signal becomes smaller, resulting in a smooth and rapid lock-in of the DLL.

The optimum clock generator 28 is constructed as shown in FIG. 2.

On the whole, the optimum clock generator 28 is constructed of a fundamental clock generation circuit 40, an optimum clock discrimination circuit and a clock selection circuit 60. The fundamental clock generation circuit 40 generates a second master clock CLK2 having the same frequency as and a 180 degree shifted phase from that of a first master clock CLK1 outputted from VCO 16. The optimum clock discrimination circuit 50 discriminates a first active leading edge clock among the first and second master clocks CLK1 and CLK2 after the correlator 22 detected a synchronization signal within the SS received signal. The clock selection circuit 60 selects the clock discriminated as optimum by the optimum clock discrimination circuit 50 among the first and second master clocks CLK1 and CLK2 outputted from the fundamental clock generation circuit 40, and outputs it as an optimum PN code clock CLK0.

The structure of the optimum clock generator 28 will be described in more particular. The fundamental clock generation circuit 40 is constructed of an invertor 42 to which the first master clock CLK1 is inputted from VCO 16 and inverted to form the second master clock CLK2.

The optimum clock discrimination circuit 50 is constructed of an R-S flip-flop 33, OR gates 51 and 52, J-K flip-flops 53 and 54, an EXOR gate 55 and a NAND gate 56. The R-S flip-flop 33 is constructed of two NAND gates 31 and 32, and is inputted with the synchronization signal detection signal from the correlator 22 at its S terminal, and with an "L (low)" level reset signal Res from the system controller at its R terminal. The OR gate 51 is inputted with the Q output from the R-S flip-flop 33 and with the first master clock CLK1. The OR gate 52 is inputted with the Q output from the R-S flip-flop 33 and with the second master clock CLK2. The J-K flip-flop 53 is inputted with an output from the OR gate 51 at its clock terminal, with an "L" level signal at its K terminal, and with a reset signal Res from the system controller at its clear terminal CR. The J-K flip-flop 54 is inputted with an output of the OR gate 52 at its clock terminal, with an "L" level signal at its K terminal, and with a reset signal Res at its clear terminal CR. The EXOR gate 55 is connected at its input terminal to the Q terminals of the J-K flip-flop 53 and 54. The NAND gate 56 is inputted with an output from the EXOR gate 55 and with an "H (high)" level signal, and is connected at its output terminal to the J terminals of the J-K flip-flop 53 and 54.

When a reset signal Res of "L" level is inputted to the R terminal of the R-S flip-flop 33, it is initialized and makes high the Q output. When an "L" level signal is inputted to the S terminal in this condition, the R-S flip-flop 33 is inverted to make low the Q output.

This "L" level signal is used as a basic signal for discriminating an optimum clock.

While the R-S flip-flop 33 outputs an "H" level signal, the OR gates 51 and 52 supply an "L" level signal to the clock terminals of the J-K flip-flops 53 and 54, irrespective of change in the first and second master clocks CLK1 and CLK2 outputted from the fundamental clock generation circuit 40. However, while the R-S flip-flop 33 outputs an "L" level signal, the OR gates 51 and 52 supply the first and second master clocks CLK1 and CLK2 as they are to the J-K flip-flops 53 and 54.

The J-K flip-flops 53 and 54 are cleared and make low the Q outputs when an "L" level signal is inputted to the clear terminals, make high the Q outputs when a leading edge is inputted to the clock terminals under the conditions of clear terminal "H" input and J terminal "H" input, and continue unchanged when a leading edge is inputted to the clock terminals under the conditions of clear terminal "H" input and J terminal "L" input.

The EXOR gate 55 outputs an "L" level signal when both the input terminals are supplied with the same "L" or "H" level signal, and outputs an "L" level signal when the input terminals are supplied with different level signals "L" and "H".

The NAND gate 56 outputs an "H" level signal when an "L" output is supplied from the EXOR gate 55, and outputs an "L" level signal when an "H" output is supplied from the EXOR gate 55.

The clock selection circuit 60 is constructed of a selector 61 having four input terminals A0 to A3, two select terminals S0 and S1, and one output terminal Y. The first master clock CLK1 is applied to the input terminals A0 and A1, and the second master clock CLK2 is applied to the input terminal A2 to which the output of the invertor 42 of the fundamental clock generation circuit 40 is connected. The select terminal S0 is connected to the Q terminal of the J-K flip-flop 53, the select terminal S1 is connected to the Q terminal of the J-K flip-flop 54, and the output terminal Y is connected to the counter 24 and PN code generator 12.

The clock selection circuit 60 selects an input to the terminal A0 and outputs it from the output terminal Y under the conditions of "L" inputs to both S0 and S1 terminals; selects an input to the terminal A1 (same as the terminal A0 input) and outputs it from the terminal Y under the conditions of "H" input to S0 and "L" input to S1; and selects an input to the terminal A2 and outputs it from the terminal Y under the conditions of "L" input to S0 and "H" input to S1. The output from the terminal Y is an optimum PN code clock CLK0.

Next, the operation of the optimum clock generator 28 will be described with reference to the timing chart shown in FIG. 3.

First, the system controller gives a synchronization detection instruction to the correlator 22 to start the receiving operation of the receiver, and at the same time sends a reset signal Res of "L" level to the optimum clock generator 28.

With this reset signal, the R-S flip-flop 33, J-K flip-flops 53 and 54 are reset. The R-S flip-flop 33 makes high the Q output, and the J-K flip-flops 53 and 54 make low the Q outputs.

With the "H" outputs from the R-S flip-flop 33, the clock terminals of the J-K flip-flops 53 and 54 become "H".

With the "L" outputs from the J-K flip-flops 53 and 54, the output of the EXOR gate 55 becomes low and the output of the NAND gate 56 becomes high, so that the J terminals of the J-K flip-flops 53 and 54 become high.

When the "L" outputs from the J-K flip-flops 53 and 54 are applied to the clock selection circuit 60, the selector 61 selects an input to the terminal A0, i.e., the first master clock CLK1, and supplies it as the optimum PN code clock CLK0 from the terminal Y to the PN code generator 12 and counter 24.

In this condition, when the correlator 22 detects a synchronization signal within the SS received signal, it outputs a synchronization signal detection signal of negative pulse to the optimum clock generator 28 and counter 24.

Since the synchronization signal detection signal is inputted to the S terminal of the R-S flip-flop 33, the optimum clock generator 28 inverts the Q output and makes it low.

Then, the outputs of the two OR gates 51 and 52 change in accordance with the inputted first and second master clocks CLK1 and CLK2.

After the R-S flip-flop 33 was inverted, assuming that the second master clock CLK2 has a first leading edge as shown in FIG. 3, the J-K flip-flop 54 is caused to be inverted by the leading edge thereof so that its Q output is made high.

Upon reception of the change in the Q output of the J-K flip-flop 54, the output of the EXOR gate 55 becomes high, the output of the NAND gate 56 becomes low, the J terminal inputs of the J-K flip-flops become low, and the other K terminal inputs become low. Therefore, the J-K flip-flops 53 and 54 do not change the Q outputs regardless of the input of following leading edges to the clock terminals.

As a result, the selector 61 takes the conditions of "L" input to the select terminal S0 and "H" input to the select terminal S1. Thereafter, the second master clock CLK2 inputted to the terminal A2 is outputted as the optimum PN code clock CLK0 from the terminal Y to the counter 24 and PN code generator 12.

When a synchronization signal detection signal of negative pulse is inputted to the counter 24 from the correlator 22, the counter 24 is reset to make its count "0".

After the synchronization signal detection signal is inputted, the counter 24 counts up the optimum PN code clock CLK0 (in this case, the second master clock CLK2) sent from the optimum clock generator 28 at its leading edge. When the counter 24 counts a predetermined number of optimum PN code clocks, it outputs a reset signal to the PN code generator 12.

The synchronization signal detection signal of negative pulse outputted from the correlator 22 has a pulse width of ¾ clock for example. Therefore, the counter 24 starts count operation at the second leading edge of the second master clock CLK2 after the correlator 22 outputted the synchronization detection signal.

Upon reception of the reset signal from the counter 24, the PN code generator 12 performs initial synchronization of the PN code, and thereafter, sequentially generates PN codes in response to the optimum PN code clock CLK0 (second master clock CLK2) inputted from the optimum clock generator 28.

As seen from FIG. 3, the timing, when a leading edge of the second master clock CLK2 reaches after the correlator 22 detected the synchronization signal, is faster than the leading edge of the first master clock CLK1 by ½ clock so that the delay from the time when the correlator 22 detects the synchronization signal becomes less.

As a result, the timing when the counter 24 outputs a reset signal delays less from the data start position within one frame of the SS received signal so that the DLL process starts near the center of the lock-in range, to thus ensure reliable and smooth lock-in. Accordingly, a reliable data demodulation of SS communications can be carried out immediately after the start of receiving operation.

In the above embodiment, the optimum clock generator 28 is provided between the output side of VCO and the counter 24 and PN code generator 12. In the optimum clock generator 28, the first and second master clocks CLK1 and CLK2 are generated by the fundamental clock generation circuit 40 using the VCO output and the inverted clock thereof. After the correlator 22 supplied the synchronization signal detection signal to the optimum clock generator 28, the master clock having a first active leading edge is discriminated by the optimum clock discrimination circuit 50. The clock selection circuit 60 selects the discriminated master clock and outputs it as the optimum PN code clock CLK0 to the counter 24 and PN code generator 12. The phase delay of the optimum PN code clock CLK0 when a first leading edge thereof is received after the correlator 22 detected the synchronization signal, becomes ½ clock duration at a maximum. The following count operation of the counter 24 and the PN code generation are carried out using the optimum PN code clock CLK0. Therefore, the timing when the counter 24 outputs a reset signal delays less from the data start position within one frame of the SS received signal so that the DLL process starts near the center of the lock-in range, to thus ensure reliable and smooth lock-in. Accordingly, a reliable data demodulation of SS communications can be carried out immediately after the start of receiving operation.

In the above embodiment, two types of master clocks having the same frequency and 180 degree different phases have been used as the master clocks. However, the invention is not limited thereto, but three or more types of master clocks having the same frequency and 360/n degree different phases may be used, wherein n = 3, 4, 5, . . . The master clock having a first leading edge is detected after the correlator detected the synchronization signal, similar to the above embodiment. In this case, the fluctuation of timing when an active clock is received after the synchronization detection can be reduced less than ½ clock duration at a maximum.

Although the receiving unit of an SS receiver has been used by way of example in the above embodiment, the invention is also applicable to other apparatus. For example, in a bit clock generator of a data receiver which receives a synchronous serial data with start and stop bits, a plurality of master clocks having different phases are generated using a high speed internal clock. The master clock having a first active clock is discriminated after a start bit detection circuit detected a start bit. The discriminated master clock is used as the optimum clock, and frequency-divided by a division counter at a predetermined ratio to obtain bit clocks for character reading.

According to the present invention, the optimum clock generator in a data receiver is constructed of a clock generator for generating a plurality of clocks having different phases, a synchronization signal detection circuit for detecting a synchronization signal within a received signal, an optimum clock discrimination circuit for discriminating a first active clock from said plurality of clocks after said synchronization signal detection circuit detected said synchronization signal, and a clock selection circuit for selecting and outputting said clock discriminated from said plurality of clocks by said optimum clock discrimination circuit. Therefore, the fluctuation of the timing, when a first active clock is received after the synchronization signal was detected within the received signal, is made smaller so that a more reliable receiving operation of a data receiver is ensured.

What is claimed is:

1. A spread spectrum communication receiver comprising:
    means in response to a received spread spectrum signal for detecting an initial synchronization time point by referring to a PN code in the received spread spectrum signal;
    means for generating a clock signal;
    means in response to the clock signal for generating a PN code signal;
    means for controlling said PN code generating means to hold the synchronization of the generated PN code signal with the received spread spectrum signal; and
    means for decoding the received spread spectrum signal by using the generated PN code signal which is in synchronization with the received spread spectrum signal, wherein
    said clock signal generating means for selecting as the clock signal one of a plurality of clock signals having different respective phases in response to the detection of the initial synchronization time point with the selected clock signal having an active transition which takes place after the initial synchronization timing point earlier than the remaining clock signals.

2. A spread spectrum communication receiver according to claim 1, further comprising means for counting the selected clock signal, wherein said means for counting is initialized in response to the detection of the initial synchronization time point and issues a signal of resetting said PN code generating means when the count reaches a selected value.

* * * * *